United States Patent Office 3,684,656
Patented Aug. 15, 1972

3,684,656
PROCESS FOR THE MICRO-BIOLOGICAL PREPARATION OF STEROIDS
Willem F. van der Waard, Delft, Netherlands, assignor to Koninklijke Nederlandsche Gist- en Spiritusfabriek N.V., Delft, Netherlands
No Drawing. Continuation-in-part of application Ser. No. 722,185, Apr. 18, 1968, which in a continuation-in-part of application Ser. No. 587,409, Oct. 18, 1966. This application Apr. 27, 1970, Ser. No. 32,375
Claims priority, application Netherlands, Oct. 22, 1965, 6513718; Apr. 18, 1967, 6505450
Int. Cl. C07c *167/18*
U.S. Cl. 195—51 G                     13 Claims

ABSTRACT OF THE DISCLOSURE

Process for the microbiological 17-side chain degradation of steroids having the carbon skeleton shown below:

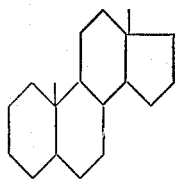

and bearing at carbon atom 17 an aliphatic group with a minimum of 8 carbon atoms. Enzymes of micro-organisms are used which, with no inhibitor present, would attack the carbon skeleton shown above. This attack is avoided by using inorganic ions as inhibitors.

PRIOR APPLICATION

The present application is a continuation-in-part of copending, commonly assigned U.S. patent application Ser. No. 722,185, filed Apr. 18, 1968, and now abandoned, which application in turn is a continuation-in-part of the then copending, commonly assigned U.S. patent application Ser. No. 587,409, filed Oct. 18, 1966, and now abandoned.

PRIOR ART

It has long been known that certain micro-organisms are capable of completely breaking down steroids with a side-chain at carbon atom 17, such as cholesterol. In 1913 Soehngen found that bacteria of the genus Mycobacterium could grow in a medium containing cholesterol as the sole source of carbon [Zentr. bl. Bakt. II Abt., 37 (1913), 595].

In 1942 Tak devoted to these phenomena a research in the course of which he isolated a bacterium which he called *Mycobacterium cholesterolicum* [Ant. van Leeuwenhoek, 8 (1942), 32]. After this, publications appeared on the conversion of cholesterol, in which micro-organisms of the genera Proactinomyces, Azotobacter, Flavobacterium, Aerobacter, Pseudomona, Nocardia and Streptomyces are mentioned.

In these conversions cholesterol is broken down completely into compounds having a low molecular weight, and no appreciable amounts of intermediates with a steroid character accumulate. 4-cholestene-3-one and 7-dehydrocholesterol are sometimes detected in small amounts. On one occasion a small amount of 4-cholestene-3,6-dione is mentioned by Tak.

Whitmarsh tried to slow down the breakdown of cholesterol (with Nocardia species) by addition of an organic inhibitor hoping thus to isolate intermediates which might give an indication of the route by which this breakdown proceeds. The inhibitor used by him was 8-hydroxyquinoline, and it was then possible to detect 3-keto-$\Delta^4$-bis-norcholenic acid as well as a very small amount of 3-keto-$\Delta^{1,4}$-bis-norcholenic acid in acid extracts of the culture medium. In the neutral fraction small amounts of 1,4-androstadiene-3,17-dione and 4 - androstene-3,17-dione were detected [Bioch. J., 90 (1964), 23P].

According to Abstracts of Papers of the 150th Meeting of the American Chem. Soc. (1965), 13 Q. C.J. SIH c.s. subjected 1,3,5(10)-cholestatriene to the action of bacteria, with the intention of obtaining estrone. It was found that the substratum was not converted by organisms of the genera Nocardia and Mycobacterium. On the other hand, 19-hydroxy-4-cholestene-3-one was readily converted into estrone, and 6,19-oxido-4-cholestene-3-one into 6,19-oxido-4-androstene-3,17-dione by these micro-organisms.

OBJECTS OF THE INVENTION

An object of the present invention is the development of a process of converting a steroid having an aliphatic group of at least 8 carbon atoms on the $C_{17}$ carbon atoms to a steroid free of a carbonaceous substituent on the $C_{17}$ carbon atom by the action of micro-organisms in the presence of an inorganic inhibitor.

A further object of the present invention is the development of a process for the preparation of a steroid having a dimethyl-cyclopentanoperhydrophenanthrene configuration and being free of a carbonaceous substituent on the carbon atom in the 17 position which comprises the steps of subjecting a steroid having at least 27 carbon atoms, a dimethyl-cyclopentanoperhydrophenanthrene configuration, an oxygenated function on the carbon atom in the 3 position and an aliphatic substituent containing at least 8 carbon atoms on the carbon atom in the 17-position to the action of enzymes of micro-organisms selected from the group consisting of the order Actinomycetales and the genera Brevibacterium and Arthrobacter, in the presence of an effective amount of an inorganic inhibitor selected from the group consisting of nickel ions, cadmium ions, cobalt ions, lead ions and selenite ions, whereby any attack on the ring system of said steroid is inhibited, and recovering said steroid having a dimethyl-cyclopentanoperhydrophenanthrene configuration and being free of a carbonaceous substituent on the carbon atoms in the 17 position.

These and other objects of the invention will become more apparent as the description thereof proceeds.

DESCRIPTION OF THE INVENTION

It is now found possible to prepare steroid containing no carbonaceous substituent in the 17 position by microbiological conversion of steroids containing a saturated or unsaturated aliphatic radical with at least 8 carbon atoms in the 17 position, with the aid of enzymes of micro-organisms of the order Actinomycetales or the genera Brevibacterium and Arthrobacter in the presence of an effective amount of an inorganic inhibitor selected from the group of nickel ions, cadmium ions, cobalt ions, lead ions or selenite ions, whereby any attack on the ring system of said steroid is inhibited.

The process of the invention utilizes steroids, the ring system of which is attacked during the microbiological conversion of the enzymes.

As examples of starting products specifically the following 3-keto or 3-hydroxysteroids with a side-chain in the 17 position are mentioned: cholesterol, β-sitosterol, stigmasterol, 4-cholesten-3-one, and campesterol. The side-chain of these steroids is preferably composed of carbon and hydrogen only.

Derivatives of these sterols may also be used, such as esters, for example, cholesteryl betainate chloride, cholesteryl acetate, cholesteryl hemi-succinate, or substituted sterols such as 5α-chlorocholestanol, or also sterols in which further one or more additional substitutions are present in the A-ring.

The micro-organisms of the order Actinomycetales and the genera Brevibacterium and Arthrobacter are capable of attacking the ring system of the steroid containing in position 17 a saturated or unsaturated aliphatic radical of at least 8 carbon atoms whereby the ring system is broken down giving low molecular weight products. This breakdown is avoided by the use of the inorganic inhibitors of the invention. Various species of the genera Mycobacterium and Nocardia which both belong to the order of Actinomycetales and of the genera Brevibacterium and Arthrobacter have been found to be suitable for the purpose of the invention. The species *Mycobacterium phlei*, *Mycobacterium butyricum* and *Brevibacterium lipolyticum* may be particularly mentioned.

Suitable inorganic inhibitors, which inhibit the breakdown in such a way that the steroid ring structure and the correspondng angular methyl groups remain intact as much as possible, are nickel ions, cobalt ions, cadmium ions, lead ions and selenite ions.

A special object of the invention is the preparation of steroids having a skeleton of 19 carbon atoms which together form the dimethyl-cyclopentanoperhydrophenanthrene skeleton, and in particular, the preparation of 1,4-androstadiene-3,17-dione and 4-androstene-3,17-dione.

The keto group in position 17 can be easily detected by means of the Zimmerman reaction if no substituents are present at carbon atom 16 [W. Zimmerman, Hoppe Seylers Z. Physiol. Chemie, 233 (1935), 257].

The androstadiene dione is a valuable product because it can serve as starting material for the preparation of compounds with androgenic, estrogenic, anabolic and antigonceptional activity.

The new process makes it possible, inter alia, to convert the cholesterol occurring in nature, which in itself is used only to a limited extent, into an intermediate product of great value.

For the proper application of the process, it is necessary to cultivate the micro-organisms in a medium containing an inorganic or organic source of nitrogen, such as amino-acids, ammonium salts, nitrates of alkali and alkaline earth metals, and peptone. Corn steep liquor, yeast extract, cottonseed meal, soybean meal, "distillers' solubles" and the like are also very suitable. Assimilable sources of carbon, such as sugars, starch, polyvalent alcohols may be used in the media, although in most cases the presence of an organic nitrogen source will be sufficient. Furthermore, a suitable medium also contains the usual quantity of salts, such as phosphates, chlorides and sulfates of alkali and alkaline earth metals. Trace elements are usually present in sufficient amounts owing to the use of tap water.

When natural sources of nitrogen consisting of a complicated mixture, such as corn steep liquor, are used, the addition of mineral salts may often be omitted.

The media are sterilized in the conventional way and after this treatment may have a pH of 4.0 to 8.5, an acidity of about 7.0 being usual.

When the cells have grown sufficiently in the medium under constant aeration, the steroid, e.g., cholesterol or β-sitosterol, can be added, either dissolved in a suitable solvent such as N,N-dimethylformamide, or in the form of a fine suspension in water.

The quantity of inhibitor to be added depends on circumstances. If the concentration is too low, the steroid added will be broken down completely into substances having a low molecular weight. If the concentration is too high, the conversion of the steroid will be greatly inhibited and the micro-organisms will sometimes even be killed. If $NiSO_4 \cdot 7H_2O$ is used, a concentration of 10 to 10,000 mg. per liter is sufficient, although circumstances in which a lower or a higher concentration is desirable are conceivable. If cobalt chloride, cadmium sulfate, lead acetate or sodium selenite is used, the concentration preferably also falls in the above-mentioned range.

The moment at which the steroid is added lies between 0 to 72 hours after inoculation, although reasonable results are also achieved with later addition. Preferably, however, addition takes place 24 to 48 hours after inoculation of the culture, when the micro-organisms have grown sufficiently. A very early addition, for instance, immediately after inoculation, remains possible. The inhibitor will, in general, be added simultaneously with the steroid, because the bacteria are not killed when the inhibitor is added in a suitable concentration. This can readily be ascertained by reference to cultures obtained by streaking the culture, after addition of steroid and inhibitor, on a suitable culture medium.

The conversion of the steroid takes place with constant aeration at a temperature varying between 20° and 45° C., although the process will also proceed at a lower or a higher temperature. The reaction is preferably made to take place at 30° C., although it is not necessary for the temperature during the phases of culture growth and degradation process to be the same. The micro-organism may first be grown for 24 hours at 26° C., after which the temperature may be raised to 30° C. after addition of steroid and inhibitor.

The conversion of the steroid added takes one to seven days, but as a rule the quantity of desired end product does not increase any further after three days. An important main product formed in the case of sterols when no further substitution has taken place in the A-ring is 1,4-androstadiene-3,17-dione, with small amounts of 4-androstene-3,17-dione in addition, the yield ratios being dependent, inter alia, on the aeration. The circumstances as described lead to a desirable preponderance of 1,4-androstadiene-3,17-dione over 4-androstene-3,17-dione. The steroids formed can be obtained from the culture liquid by extraction with a water-immiscible liquid, such as methyl isobutyl ketone, ethyl acetate, methylene chloride, chloroform. These extracts are evaporated to dryness. The residue is extracted with an organic solvent to remove non-converted substratum, such as cholesterol or sigmasterol.

The remaining solid substance can then be purified further and separated into its components by chromatography and recrystallization.

Preferably, the micro-organisms of the order Actinomycetales are of the families Mycobacteriaceae and Actinomycetaceae and the genera Mycobacterium and Nocardia.

As suitable micro-organisms necessarily produce enzymes being capable of attacking the ring system of the mentioned steroid substrata having in position 17 an aliphatic group of at least 8 carbon atoms, it is possible to trace suitable micro-organisms according to a general principle by concentrating these suitable organisms from natural sources, such as soil, dung, surface water, etc. For this purpose a culture medium is used containing cholesterol as the sole carbon source, together with some salts. The culture medium is inoculated with garden soil, dung, etc. and subsequently incubated at a suitable temperature, for example, at a temperature between 10° and 40° C., although higher or lower temperatures are not excluded. The culture may be shaken on a vibrating or rotating shaking machine, but resting cultures can also be used for concentrating the desired micro-organisms. It has also appeared to be possible to use the medium in semi-solid form (agar-agar) and to concentrate the desired micro-organism in petri dishes. It may be preferable to mix the soil, some months or weeks prior to its use, with cholesterol or a hydrocarbon mixture. Thus, Nocardia species, strain CBS Nr. 226.67 was obtained from a soil which had been mixed with a waste lubricating oil. The medium which can be used for the concentration has, for example, the following composition:

| | Gm./liter |
|---|---|
| Ammonium nitrate | 1 |
| $Na_2HPO_4$ | 1 |
| Cholesterol | 1 |
| Tap water. | |

It appeared to be possible in this way to isolate a great number of strains of suitable micro-organisms. Of these the following, in addition to others mentioned subsequently, can be mentioned:

Arthrobacter species—Strain CBS Nr. 220.67
Arthrobacter species—Strain CBS Nr. 221.67
Arthrobacter species—Strain CBS Nr. 222.67
Arthrobacter species—Strain CBS Nr. 223.67
Nocardia species—Strain CBS Nr. 226.67.

The CBS numbers are the registered numbers of the culture deposits of the micro-organisms at the Central Bureau voor Schimmelcultures at Baarn, Netherlands.

It will be appreciated that it is not necessary to concentrate and to isolate the desired strains in this way. It is also possible to isolate micro-organisms from soil and other suitable materials, and then determine if they show the desired properties. Thus, aqueous suspensions of soils were streaked on a suitable medium, such as starch-agar or asparagine-agar. In order to suppress the normal growth of fungi a fungicide antibiotic was added, for example, 15 $\mu$g. of Pimaricin per ml. By prior suitable dilution of the soil suspension, separated colonies of micro-organism can be isolated. These micro-organisms can then be cultured in a suitable medium and the culture can be tested for its capability of attacking a steroid containing in position 17 a saturated or unsaturated aliphatic radical of at least 8 carbon atoms. In this way, a number of Nocardia species were isolated, which are capable of attacking and degrading cholesterol and, therefore, formed the desired steroid of 19 carbon atoms after addition of the inorganic inhibitors mentioned above. Especially Nocardia species, strain CBS 224.67 and Nocardia species, strain CBS 225.67, appeared to be especially suitable for the present process.

The invention is elucidated by reference to the following examples which are not to be deemed limitative in any respect.

EXAMPLE I

An inoculation culture of *Mycobacterium phlei*, strain CBS Nr. 495.66, is prepared by inoculating a culture of this bacterium on broth agar, incubated for three days at 30° C., in a medium consisting of a solution of 10 gm. of yeast extract (Difco) in 1 liter of tap water having a pH of 6.8, which has previously been sterilized for 30 minutes at 110° C. The medium is contained in 2-liter flasks. Each flask contains 500 ml. of medium.

The culture is shaken for 48 hours at 30° C. on a shaking apparatus of the rotary type at a rate of 250 r.p.m. and a stroke of 2½ cm., after which the bacteria have grown sufficiently to be inoculated further.

The main fermentation medium is prepared by diluting in each case 5 gm. of cornsteep liquor (calculated as dry matter) with tap water to 1 liter and subsequently bringing the liquid to a pH of 7.0 with aqueous sodium hydroxide solution. This medium is sterilized in three flasks for 30 minutes at 110° C. Each of the three 2-liter flasks used contains 1 liter of medium. The flasks are now inoculated with the inoculation culture described above, 50 ml. being added to each of the flasks. The inoculation percentage is therefore 5%. The flasks are shaken for 48 hours at 30° C. in the same way as described above.

To each of the flasks 1 gm. of cholesterol is added in the form of a suspension in water, obtained by pulverizing the steroid in a mortar with addition of water containing 0.1% of Tween-80. Further a sterile solution of 750 mg. of $NiSO_4 \cdot 7H_2O$ in water is added to each flask, which amounts to 157 mg. of nickel ions. The flasks are now shaken further under the same conditions. Already 12 hours after addition of the cholesterol, the presence of 1,4-androstadiene-3,17-dione can be demonstrated by means of thin-layer chromatography. For this, silica gel G according to Stahl is used. The eluent consists of a mixture of chloroform and ethyl acetate in the volume ratio of 10:1.

After three days of shaking the contents of three flasks are combined and the mixture is extracted three times with ⅕ its volume of methyl isobutylketone. The extract is evaporated to dryness under reduced pressure and the residue is extracted with 20 ml. of boiling methanol. In consequence the non-converted cholesterol is removed. From the residue, 1.6 gm. of cholesterol can be recovered. The methanol extract contains the desired product. After evaporation to dryness it is taken up in 8 ml. of benzene, upon which this solution is chromatographed over a column containing 30 gm. of aluminum oxide ($Al_2O_3$) according to Woelms, neutral, activity III). The column is eluted with a mixture of benzene and acetone (10:1), while it is ascertained by means of thin-layer chromatography in which fractions the 1,4-androstadiene-3,17-dione is present. The fractions in question are collected and evaporated.

The residue is recrystallized from a mixture of acetone and heptane (1:3). In this way 160 mg. of crystals are obtained, from which, after renewed crystallization, finally 138 mg. of pure product are obtained. This amounts to a yield of 13.4% based on the cholesterol consumed.

The melting point is 137.5 to 139° C. and that of a sample of androstadiene diene of analytical quality is 137° to 138° C. A mixture of the two crystalline products shows no lowering of the melting point. The infrared spectra of the two samples are identical.

EXAMPLE II (a) Analogously to the process described in Example I, a culture of *Mycobacterium phlei*, CBS Nr. 494.66, is prepared.

The main fermentation takes place in three 500-ml. flasks, each of which contains 100 ml. of medium. Here again an inoculation culture of 5% is used, in relation to the quantity of main fermentation medium. The flasks are shaken in the usual way and 48 hours after inoculation, 200 mg. of cholesterol are added to each flask and also 50 mg. of $NiSO_4 \cdot 7H_2O$, after which the shaking is continued. After three days the flasks together contain quantities of 1,4-androstadiene-3,17-dione varying between 188.9 and 236 mg., usually with small amounts of 4-androstene-3,17-dione in addition.

The yield varies from 42.8 to 53.6% based on the cholesterol added.

(b) Analogously to the process described in Example I, a culture of *Brevibacterium lipolyticum*, IAM Nr. 1398, is prepared. The main fermentation takes place as described above under (a). After three days the presence of 1,4-androstadiene-3,17-dione could be demonstrated by means of thin-layer chromatography.

EXAMPLE III

In accordance with the process of Example II, a culture of *Mycobacterium phlei*, CBS Nr. 495.66, is used.

To each of the flasks is added 400 mg. of cholesterol and after four days 93 mg. of 1,4-androstadiene-3,17- dione can be isolated by the method described in Example I. The quantity of non-converted substratum amounts to 230 mg. for each of the flasks. Accordingly, at most, 170 mg. of cholesterol have been converted in each flask, from which theoretically 124 mg. of 1,4-androstadiene-3,17-dione might be obtained. From these data it appears that the conversion has taken place in a yield of 75% based on cholesterol converted and of 31.6% based on cholesterol added.

EXAMPLE IV

Analogously to Example II, *Mycobacterium butyricum*, ATCC 11.314, is utilized. Isolation and purification according to Example I yielded 30 mg. of 1,4-androstadiene-3,17-dione in each flask after three days' shaking. The yield is 20.4% based on cholesterol added.

EXAMPLE V

*Mycobacterium phlei*, CBS Nr. 495.66, is treated according to Example II. Instead of cholesterol, however, 400 mg. of β-sitosterol is added to each of the flasks. After four days 37 mg. of 1,4-androstadiene-3,17-dione is isolated from each of the flasks according to Example I. This amounts to a yield of 13.5% based on β-sitosterol added.

EXAMPLE VI

The procedure is the same as in Example III, with the difference that 400 mg. of stigmasterol is added to each of the flasks. After three days the presence of 1,4-androstadiene-3,17-dione can be demonstrated by means of thin-layer chromatography, as described in Example I.

EXAMPLE VII

A culture of *Mycobacterium phlei*, CBS Nr. 495.66, is prepared as described in Example III, but instead of 50 mg. of nickel sulfate, an equal quantity of cobalt chloride is added to each of the flasks. After two days' shaking at 30° C., the presence of 1,4-androstadiene-3,17-dione and 4-androstene-3,17-dione can be demonstrated by means of thin-layer chromatography.

EXAMPLE VIII

Example VII is repeated, with the difference that instead of nickel sulfate, 5 mg. of cadmium sulfate is added to each of the flasks. After one day's shaking, the presence of quantities of 1,4-androstadiene-3,17-dione as well as 4-androstene-3,17-dione is evident from thin-layer chromatograms. In addition, two other unknown stains are visible, which show a positive Zimmerman reaction. The quantity of the product is determined by extraction of the liquid with methyl isobutylketone and chromatography of the extract on paper in a system of benzene heptane (5:4) saturated with formamide, elution of the respective stain with methanol, and measurement of the extinction at a wavelength of 244 m$\mu$ in a unicam spectrophotometer.

A mixture of 1,4-androstadiene-3,17-dione and 4-androstene-3,17-dione is present in each of the flasks in a quantity of 29.4 mg. (yield of 10% calculated on cholesterol added).

EXAMPLE IX

The experiment described in Example VII is repeated, but instead of nickel sulfate, 50 mg. of lead acetate is added to each of the flasks. After two days already a considerable formation of 1,4-androstadiene-3,17-dione is found by means of thin-layer chromatography.

EXAMPLE X

The experiment described in Example VII is repeated, but instead of nickel sulfate, 50 mg. of sodium selenite is added to each of the flasks. By means of thin-layer chromatography, after two days, the formation of 1,4-androstadiene-3,17-dione can be detected. 4-androstene-3,17-dione is also present.

EXAMPLE XI

The procedure is analogous to that in Example III, with the difference that instead of cholesterol, 200 mg. of 4-cholestene-3-one is added to each of the flasks. After three days' shaking, by means of the method of extinction measurement described in Example VIII, a quantity of 25 to 30 mg. of 1,4-androstadiene-3,17-dione can be detected (yield of 16.9 to 20.2% based on cholesterol added).

EXAMPLE XII

The procedure is analogous to that in Example III, with the difference that instead of cholesterol, 200 mg. of the readily water-soluble cholesteryl betainate chloride is added to each of the flasks. After four days' shaking the reaction product is isolated and purified in the way described in Example I. Thus, 20 to 25 mg. of 1,4-androstadiene-3,17-dione, as well as small amounts of 4-androstene-3,17-dione, are obtained (yield of 18.3% to 22.9% based on cholesteryl betainate chloride added).

EXAMPLE XIII

The procedure is analogous to that in Example IV, with the difference that 200 mg. of 5α-chlorocholestanol is now added to each of the flasks. Isolation and purification according to Example I yield 16.7 mg. of 1,4-androstadiene-3,17-dione and 3.9 mg. of 4-androstene-3,17-dione, a total yield of 15.3% based on 5α-chlorocholestanol added. The products formed contain 18.9% of 4-androstene-3,17-dione.

An inoculation culture of Nocardia species, strain CBS Nr. 225.67, is prepared by inoculating a culture of this micro-organism on peptone-glucose-agar, incubated for three days at 30° C., in a medium consisting of a solution of 10 gm. of yeast extract (Difco) in 1 liter of tap water having a pH of 6.8 which has previously been sterilized for 30 minutes at 110° C. The medium is contained in 500-ml. flasks. Each flask contains 100 ml. of medium.

The culture is shaken at 30° C. for 48 hours on a shaking apparatus of the rotary type at a rate of 250 r.p.m. and a stroke of 2½ cm., after which the micro-organism has developed sufficiently to be inoculated further.

The main fermentation medium is prepared by diluting in each case 3 gm. of cornsteep liquor (calculated as dry matter) with tap water to 1 liter, dissolving 3 gm. of glucose liquid therein and finally adjusting the medium to a pH of 7.0 with aqueous sodium hydroxide. This medium is sterilized in 12 flasks at 110° C. for 30 minutes. The 2-liter flasks each contain 1 liter of medium. The flasks are now inoculated with inoculation culture described above, 50 ml. being added to each of the flasks. The inoculation percentage is therefore 5%.

The flasks are shaken for 24 hours at 30° C. in the same way as described above.

The substrate, cholesterol, is pulverized in a mortar under addition of water containing 0.1% of Tween-80. This suspension is added to the above-mentioned cultures in such an amount that each of the flasks contains 1 gm. of cholesterol. Simultaneously, a sterile solution of 500 mg. of $CoCl_2 \cdot 6H_2O$ in water is added to each flask, which amounts to about 125 mg. of cobalt ions per liter. Then the flasks are shaken further under the same conditions. Already 12 to 24 hours after addition of the cholesterol the presence of 1,4-androstadiene-3,17-dione and 4-androstene-3,17-dione can be shown by means of thin-layer chromatography. For this, a few milliliters of the culture liquid are extracted with an equal volume of ethyl acetate and chromatography of the extract is effected by using silica gel G according to Stahl. DC-Fertigplatten Kieselgel $F_{254}$ (Merck A.G.) can also be used. The eluent consists of a mixture of chloroform and ethyl acetate in the volume ratio 100:6.

After three days' shaking the contents of 12 flasks are combined and the mixture is extracted three times with 20% of its volume of methylisobutylketone. The extract is evaporated to dryness under reduced pressure and the residue is extracted with 80 ml. of boiling methanol. This treatment results in a separation of non-reacted cholesterol from desired product. From the residue 5.2 gm. of cholesterol can recovered. The methanol extract contains the androstadiene dione. After evaporation to dryness, it is taken up in 30 ml. of benzene, and the solution is chromatographed on a column containing 150 gm. of alumina ($Al_2O_3$ according to Woelm, neutral, activity III).

The column is eluted with a mixture of benzene and acetone, (10:1), and the fractions containing the androstadiene dione are detected with the help of thin-layer chromatography. The fractions in question are combined and evaporated.

The residue (710 mg.) Is recrystallized from a mixture of acetone and heptane (1:3), which finally results in 640 mg. of pure product. The melting point is 139.5° to 140.5° C. A sample of very pure androstadiene-dione melts at 141° to 142° C. A mixture of the two crystalline products shows no depression of the melting point. The infra-red spectra of the two samples are identical. The yield of crystalline product, based on cholesterol used is 12.9%.

EXAMPLE XV

Analogously to the procedure described in Example XIV, a culture of Arthrobacter species, strain CBS Nr. 220.67, is prepared.

The convension now takes place in three 500-ml. flasks each containing 100 ml. of medium. Here again the amount of inoculation culture used corresponds to 5% of the volume of the main fermentation medium. The flasks are shaken in the usual way at 30° C., and to each flask 200 mg. of cholesterol and 50 mg. of $NiSO_4 \cdot 7H_2O$ are added 24 hours after inoculation, after which the flasks are shaken further. After 3 to 4 days of incubation the total quantity of 1,4-androstadiene-3,17-dione present in the flasks is 70.2 to 112 mg. In most cases, small amounts of 4-androstene-3,17-dione are also formed but, in general, the greater part of this compound disappears after some days of shaking.

The yield varies from 16.0 to 25.6% based on the cholesterol added.

EXAMPLE XVI

In accordance with the process of Example XV, a culture of Arthrobacter species, strain CBS Nr. 221.67, is used. To each of the flasks 400 mg. of cholesterol and 50 mg. of $CoCl_2 \cdot 6H_2O$ are added. After four days' shaking at 30° C., 52 mg. of 1,4-androstadiene-3,17-dione can be isolated from each flask in the way indicated in Example XIV. The amount of non-reacted cholesterol is 290 mg. in each flask. Accordingly at most 110 mg. of cholesterol have been converted in each flask, from which theoretically not more than 80 mg. of 1,4-androstadiene-3,17-dione can be formed. So the conclusion can be drawn that the conversion has taken place in the yield of 65% based on cholesterol converted and of 17.8% based on cholesterol added.

EXAMPLE XVII

Analogously to Example XVI, Arthrobacter species, strain CBS Nr. 222.67, is used. Isolation and purification according to Example XIV yield 29 mg. of 1,4-androstadiene-3,17-dione in each flask after four days' shaking. The yield is 10%, based on cholesterol added.

EXAMPLE XVIII

The procedure of Example XVII is used, i.e., with Arthrobacter species, strain CBS Nr. 222.67, with the difference that 50 mg. $NiSO_4 \cdot 7H_2O$ is now added to each flask. 24 hours after addition of cholesterol and inhibitor, the presence of 1,4-androstadiene-3,17-dione and 4-androstene-3,17-dione can be shown by thin-layer chromatography as described in Example XIV.

EXAMPLE XIX

The procedure of Example XVII is used with the difference that Arthrobacter species, strain CBS Nr. 221.67, Arthrobacter species, strain CBS Nr. 223.67, and Nocardia species, strain CBS Nr. 225,67, respectively, are used. By using $NiSO_4 \cdot 7H_2O$ as the inhibitor, 1,4-androstadiene-3,17-dione is found in quantities varying from 24 to 38 mg. in each flask, so that the yield, based on cholesterol added varies from 8.2 to 13.0%.

EXAMPLE XX

An inoculation culture of Nocardia species, strain CBS Nr. 224.67, is prepared in the way described in Example XIV. The main fermentation medium consists of a solution of 5 gm. of cornsteep liquor (calculated as dry substance) per liter of water to which 1 gm. of yeast extract (Difco) has been added. The medium is adjusted to a pH of 7.0 with aqueous sodium hydroxide and is sterilized for 30 minutes at 110° C. The 500-ml. flasks used each contain 100 ml. of this medium. The inoculation percentage is 5%.

After 24 hours' shaking, 200 mg. of cholesterol in the form of an aqueous suspension, and a solution of 50 mg. of $CoCl_2 \cdot 6H_2O$ are added to each flask. After three days' shaking, 32 mg. of 1,4-androstadiene-3,17-dione are isolated from each flask according to the method described in Example XIV. The yield is 22%, based on cholesterol added.

EXAMPLE XXI

A culture of Nocardia species, strain CBS Nr. 224.67 is prepared as described in Example XX. To each flask is added, 200 mg. of cholesterol and 15 mg. of $CdSO_4$. After 24 hours' shaking, the presence of 1,4-androstadiene-3,17-dione can be shown by thin-layer chromatography as described in Example XIV.

EXAMPLE XXII

A culture of Nocardia species, strain CBS Nr. 224.67, or of Nocardia species, strain CBS Nr. 225.67, is prepared in the way described in Example XX. To each flask are added, 200 mg. of cholesterol and sodium selenite in amounts varying from 3 to 10 mg. per flask (30 to 100 mg./liter). After 24 hours' shaking, the presence of a mixture of 1,4-androstadiene-3,17-dione and 4-androstene-3,17-dione in each of the flasks can be shown by thin-layer chromatography as described in Example XIV.

EXAMPLE XXIII

Analogously to the procedure of Example XV, a culture of Arthrobacter species, strain CBS Nr. 221.67, is prepared. Instead of cholesterol, 200 mg. of β-sitosterol is added. The inhibitor is $NiSO_4 \cdot 7H_2O$. After three days, the flasks contain 1,4-androstadiene-3,17-dione in an amount varying from 19 to 24 mg. in each flask. The yield is approximately 15%, based on the β-sitosterol added. (The commercially available β-sitosterol contains a number of steroids of practically equal structure, so an exact determination of the yield is not possible.)

EXAMPLE XXIV

Example XXIII is repeated with the difference that one of the following cultures is used: Arthrobacter species, strain CBS Nr. 222.67 and Nocardia species, strain CBS Nr. 226.67, respectively. In both cases the presence of 1,4-androstadiene-3,17-dione can be shown after three days by using thin-layer chromatography as described in Example XIV.

EXAMPLE XXV

Analogously to Example XV, a culture of Nocardia species, strain CBS Nr. 225.67, is prepared in four flasks each containing 100 ml. of medium. To each flask, 50 mg.

of $CoCl_2 \cdot 6H_2O$ are added. To the contents of each of the four flasks there is added an aqueous suspension of:

(a) 3-oxo-4-cholestene
(b) stigmasterol
(c) 5α-chlorocholestanol, and
(d) a solution of cholesteryl betainate chloride.

In all cases the quantity of steroid added to each flask was 100 mg.

After two days the presence of 1,4-androstadiene-3,17-dione could be shown by thin-layer chromatography as described in Example XIV.

The preceding specific embodiments are illustrative of the practice of the invention. It is to be understood, however, that other expedients known to those skilled in the art may be employed without departing from the spirit of the invention or the scope of the appended claims.

I claim:

1. A process for the preparation of a steroid having a dimethylcyclopentanoperhydrophenanthrene configuration and being free of a carbonaceous substituent on the carbon atom in the 17 position which comprises the steps of subjecting a steroid having at least 27 carbon atoms, a dimethylcyclopentanoperhydrophenanthrene configuration, an oxygenated function on the carbon atom in the 3 position, and an aliphatic substituent containing at least 8 carbon atoms on the 17 position, to the action of enzymes of micro-organisms selected from the group consisting of the order Actinomycetales and the genera Brevibacterium and Arthrobacter, in the presence during the steroid modification of an amount of between about 10 mg. to about 10,000 mg. per liter of the culture medium of inorganic inhibitor selected from the group consisting of nickel ions, cadmium ions, cobalt ions, lead ions and selenite ions, whereby any attack on the ring system of said steroid having at least 27 carbon atoms is inhibited; and recovering said steroid having a dimethylcyclopentanoperhydrophenanthrene configuration and being free of a carbonaceous substituent on the carbon atom in the 17 position.

2. The process of claim 1, wherein said steroid having at least 27 carbon atoms is a member selected from the group consisting of cholesterol and its esters, β-sitosterol and its esters, stigmasterol and its esters, 4-cholestene-3-one, 5α-chlorocholestanol and its esters, and campesterol and its esters.

3. The process of claim 1, wherein said enzyme of a micro-organism is an enzyme of a micro-organism selected from the group consisting of the genera Mycobacterium and Nocardia.

4. The process of claim 1, wherein said enzyme of a micro-organism is an enzyme of *Mycobacterium phlei*.

5. The process of claim 1, wherein said enzyme of a micro-organism is an enzyme of *Mycobacterium butyricum*.

6. The process of claim 1, wherein said enzyme of a micro-organism is an enzyme of *Brevibacterium lipolyticum*.

7. The process of claim 1, wherein said steroid having a dimethylcyclopentanoperhydrophenanthrene configuration and being free of a carbonaceous substituent on the carbon atom in the 17 position is a member of the group consisting of 1,4 - androstadiene - 3,17 - dione, 4-androstene-3,17-dione and mixtures thereof.

8. A process for the preparation of a 3,17-dione steroid selected from the group consisting of 1,4-androstadiene-3,17-dione, 4-androstene-3,17-dione and mixtures thereof, which comprises the steps of subjecting a steroid having at least 27 carbon atoms, a dimethyl-cyclopentanoperhydrophenanthrene configuration, an oxygenated function on the carbon atom in the 3 position and an aliphatic hydrocarbon substituent containing at least 8 carbon atoms on the carbon atom in the 17 position to the action of a culture of an organism selected from the group consisting of the order Actinomycetales and the genera Brevibacterium and Arthrobacter in a culture medium in the presence of an amount of between about 10 mg. to about 10,000 mg. per liter of culture medium of an inorganic inhibitor selected from the group consisting of nickel ions, cadmium ions, cobalt ions, lead ions and selenite ions for a period of about 1 to 7 days, and recovering said 3,17-dione steroid.

9. The process of claim 8, wherein said culture of an organism is a culture of an organism selected from the group consisting of the genera Mycobacterium and Nocardia.

10. The process of claim 8, wherein said steroid having at least 27 carbon atoms is a member selected from the group consisting of cholesterol and its esters, β-sitosterol and its esters, stigmasterol and its esters, 4-cholestene-3-one, 5α-chlorocholestanol and its esters, and campesterol and its esters.

11. The process of claim 8, wherein said organism of the genus Mycobacterium is *Mycobacterium butyricum*.

12. The process of claim 9, wherein said organism of the genus Mycobacterium is *Mycobacterium phlei*.

13. The process of claim 9, wherein said organism of the genus Mycobacterium is *Mycobacterium butyricum*.

References Cited

UNITED STATES PATENTS 3,031,379    4/1962    Knight _____ 195—51

ALVIN E. TANENHOLTZ, Primary Examiner